United States Patent
Huck

(10) Patent No.: US 11,174,965 B2
(45) Date of Patent: Nov. 16, 2021

(54) DETECTING MAINTENANCE STATUSES OF VALVES

(71) Applicant: Siemens Aktiengesellschaft, Munich (DE)

(72) Inventor: Ralf Huck, Großkrotzenburg (DE)

(73) Assignee: Siemens Aktiengesellschaft, Munich (DE)

( * ) Notice: Subject to any disclaimer, the term of this patent is extended or adjusted under 35 U.S.C. 154(b) by 359 days.

(21) Appl. No.: 16/363,616

(22) Filed: Mar. 25, 2019

(65) Prior Publication Data

US 2019/0293205 A1   Sep. 26, 2019

(30) Foreign Application Priority Data

Mar. 26, 2018 (EP) .................................. 18163917

(51) Int. Cl.
*F16K 37/00* (2006.01)
*F15B 19/00* (2006.01)

(52) U.S. Cl.
CPC ........ *F16K 37/0083* (2013.01); *F15B 19/005* (2013.01); *F15B 2211/6303* (2013.01); *F15B 2211/6313* (2013.01); *F15B 2211/6336* (2013.01)

(58) Field of Classification Search
None
See application file for complete search history.

(56) References Cited

U.S. PATENT DOCUMENTS

| | | | |
|---|---|---|---|
| 6,176,247 B1 | 1/2001 | Winchcomb et al. | |
| 8,122,905 B2* | 2/2012 | Pape | G01M 3/24 137/554 |
| 10,928,812 B2* | 2/2021 | Wagner-Stuerz | G05B 23/0254 |
| 2005/0126639 A1 | 6/2005 | Ens et al. | |

(Continued)

FOREIGN PATENT DOCUMENTS

| | | |
|---|---|---|
| CN | 101255882 | 9/2008 |
| CN | 101749296 | 6/2010 |

(Continued)

OTHER PUBLICATIONS

Office Action dated May 25, 2020 issued in Chinese Patent Application No. 201910162187.8.

*Primary Examiner* — Andre J Allen
*Assistant Examiner* — Jermaine L Jenkins
(74) *Attorney, Agent, or Firm* — Cozen O'Connor

(57) ABSTRACT

A valve system includes a valve, which is operated by a pneumatic actuator and forms part of an industrial plant, wherein the valve system includes a diagnostic system that includes either a pressure detection unit for acquiring data on a pressure variation in the pneumatic actuator and/or at least one acoustic detection unit for detecting an acoustic variation in the valve system, where the valve system additionally includes a pilot valve, preferably a solenoid valve, which controls the pneumatic actuator, an electrical connection to an electrical power supply network supplying the pilot valve to supply electrical power to either the pressure detection unit and/or the acoustic detection unit, and where the diagnostic system additionally includes a measurement unit for identifying changes in the electrical power supply network for the pilot valve to identify a starting point of a closing or opening action of the valve.

22 Claims, 4 Drawing Sheets

(56) References Cited

U.S. PATENT DOCUMENTS

| | | |
|---|---|---|
| 2006/0266966 A1 | 11/2006 | Karte et al. |
| 2006/0273776 A1 | 12/2006 | Smart et al. |
| 2008/0121290 A1 | 5/2008 | Pape et al. |
| 2010/0152907 A1 | 6/2010 | Meier et al. |
| 2010/0156183 A1 | 6/2010 | Kah et al. |
| 2014/0190263 A1 | 7/2014 | Anderson |
| 2015/0032270 A1 | 1/2015 | Gattu et al. |
| 2018/0283221 A1* | 10/2018 | Reigl .................... F01D 17/145 |
| 2020/0124064 A1* | 4/2020 | Kobayashi .............. F15B 11/08 |
| 2020/0132222 A1* | 4/2020 | Eschenmoser ........ F16K 3/0218 |
| 2020/0166154 A1* | 5/2020 | Eschenmoser ........ F16K 31/122 |
| 2020/0278705 A1* | 9/2020 | Kawamoto ........... F16K 37/005 |

FOREIGN PATENT DOCUMENTS

| | | |
|---|---|---|
| CN | 102734533 | 10/2012 |
| CN | 103912717 | 7/2014 |
| CN | 105605267 | 5/2016 |
| DE | 102005024686 | 12/2006 |
| DE | 102015118198 | 4/2017 |
| EP | 2202598 | 6/2010 |
| WO | WO9921066 | 4/1999 |
| WO | WO03091614 | 11/2003 |

\* cited by examiner

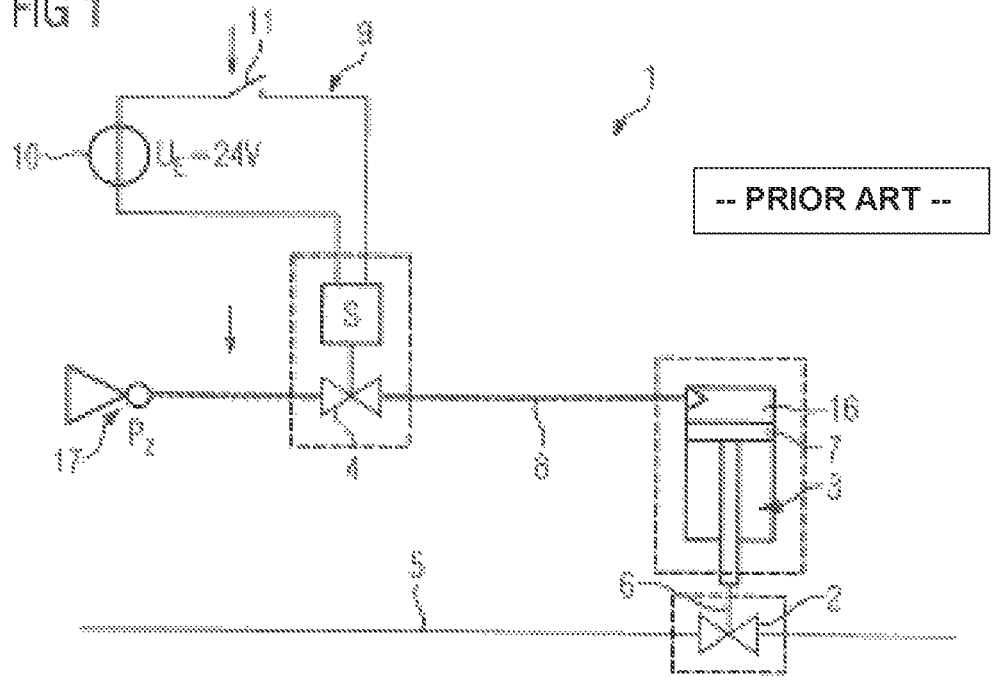
FIG 1 -- PRIOR ART --
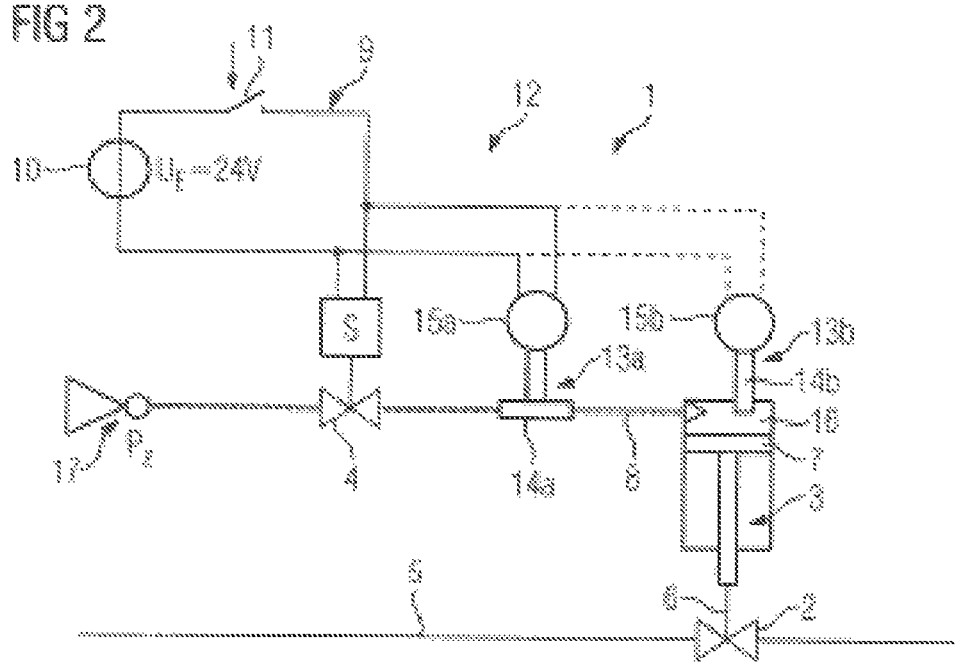
FIG 2

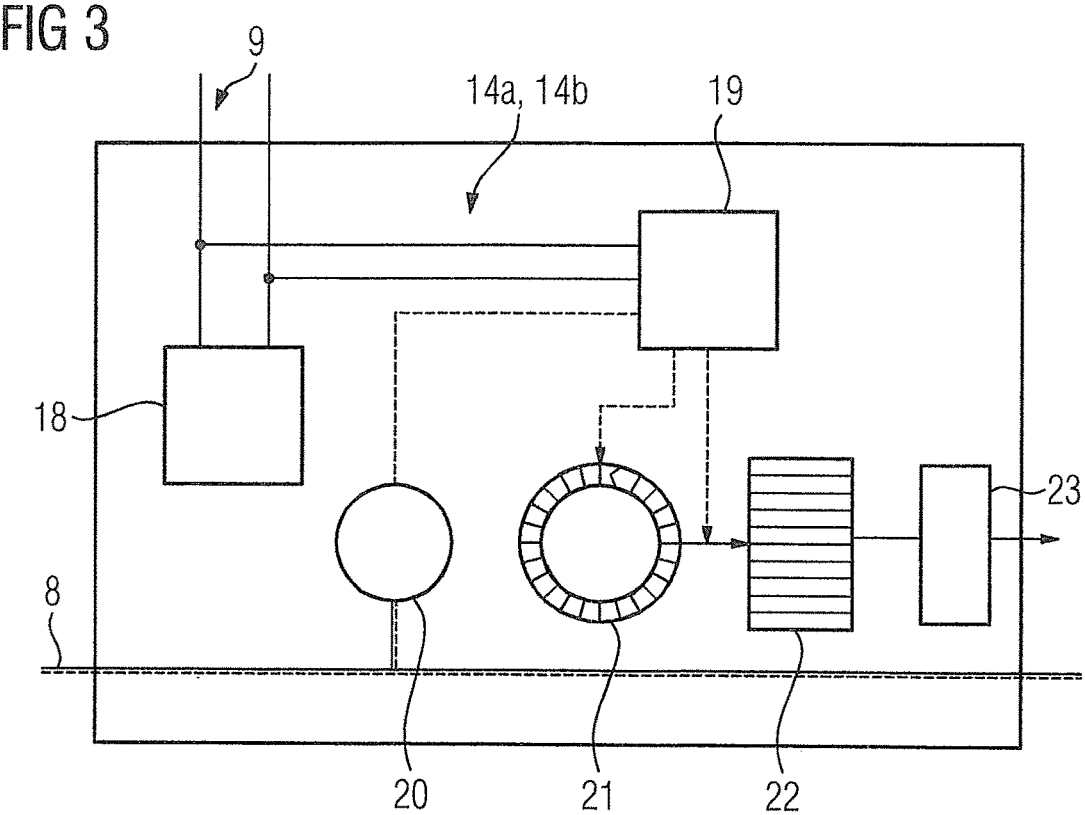
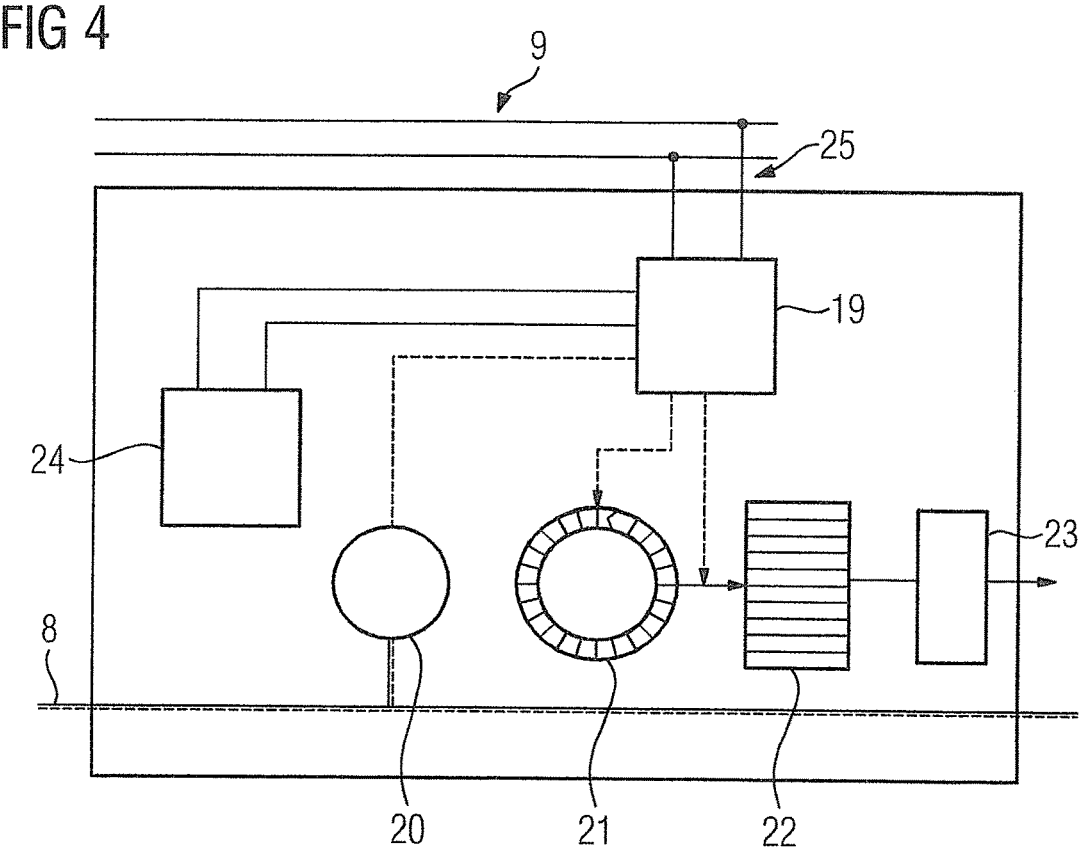

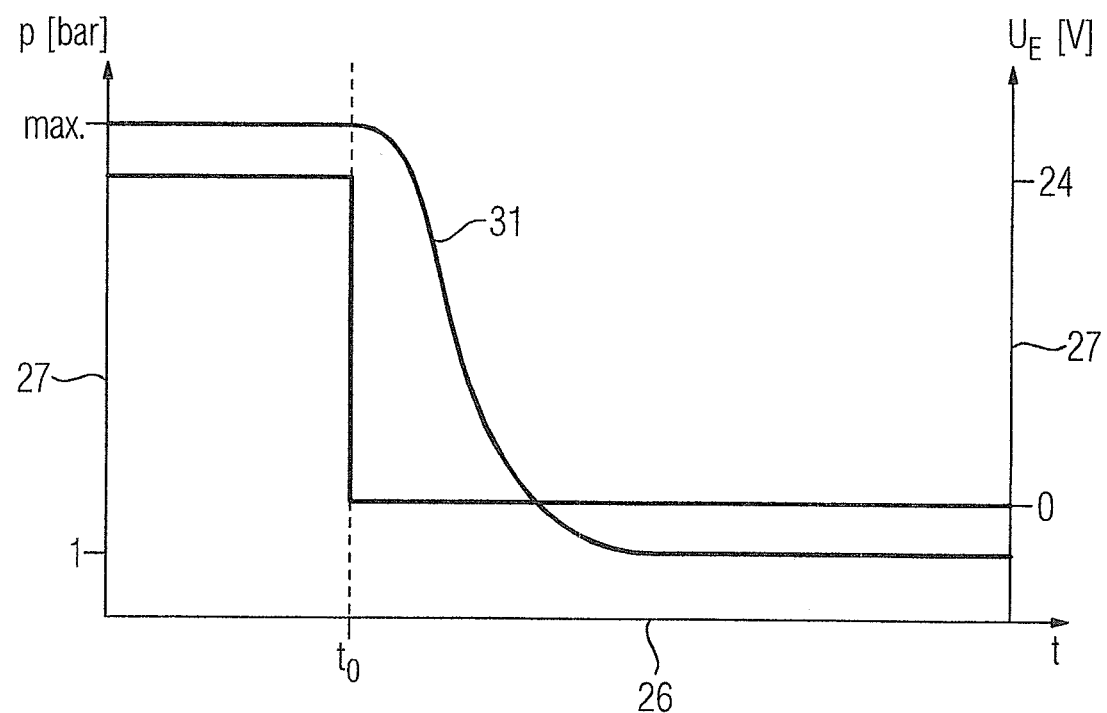

DETECTING MAINTENANCE STATUSES OF VALVES

BACKGROUND OF THE INVENTION

1. Field of the Invention

The invention relates to a valve system, an associated diagnostic system for the valve system, and to a method for detecting a maintenance status of a valve, which is contained in an industrial plant.

2. Description of the Related Art

In the process industry, pneumatic actuators and pneumatic auxiliary power, for instance, are used to open valves. Here, spring assemblies in the actuator ensure that the valve is closed if there is a loss of pneumatic auxiliary power. If one of the springs breaks, however, the valve may no longer be closed safely in the event of a fault. Thus, the regions before and after the valve may no longer be isolated from one another reliably, which can have serious consequences.

Valves are mainly used for temporary shutoff/opening. As a result, they spend relatively long periods of time in an open/closed state in order to be then closed/opened by an actuator and pneumatic auxiliary power only when required. The fact that the valve and actuator remain in their respective limits of travel for a long time means that the combination of valve and actuator is regularly prone to sticking in a limit of travel.

During the closure, for example, the valve and actuator must be released from an initial position by overcoming a breakaway thrust, before being taken into a closed position by a further drop in pressure and by the spring force of the spring assembly. The breakaway thrust increases over a life cycle of the valve as a result of wear and corrosion of the actuator. If the breakaway thrust is greater than the spring force of the spring assembly, then it may no longer be possible to close the valve even with a drop in pressure. In this case, the shutoff process can no longer be performed safely, with the potential for major damage occurring. The same phenomena occur analogously during opening, in which the breakaway thrust can be significantly greater especially for valves with a metal-to-metal seal, with the result that the maximum pressure of the pneumatic auxiliary power for a given diaphragm surface area in the actuator is no longer sufficient to open the valve, which likewise can result in substantial damage.

Another damage scenario results from a leak in the body of the valve. Chemically corrosive or highly reactive media capable of causing damage may consequently escape.

In addition, the stick/slip effect (jerking) can occur in a valve. This effect represents the start of the actuator becoming immovable.

The pneumatic auxiliary power is usually switched via solenoid valves mounted on the actuator. The solenoid valves are in turn typically switched by 24V digital outputs from central controllers or a process control system. Until now, apart from any mechanical limit-of-travel sensors that may be present, there have not been any diagnostic devices on valves.

The above-described damage scenarios for valves typically used in the process industry therefore cannot be detected, or only detected at relatively high cost. Safe operation of valves, in particular On/Off valves, has therefore been possible until now only via regular inspection and maintenance or via redundant installations (one or more redundant valves) or by over-dimensioning individual elements of the valves, such as by using more powerful springs.

In the absence of suitable diagnostic instruments, the valves are dismantled, for example, every five years for maintenance purposes, resulting in relatively high costs. Moreover, it is often found that a far longer maintenance interval would have sufficed.

To keep valves moving smoothly and to counteract a rise in the breakaway thrust, these valves can be briefly opened/closed regularly (partial stroke or full stroke test). This can be automated using what are known as positioners. The use of these positioners requires far more complex position control and more expensive actuating technology compared with solenoid valves. In addition, retrofitting entails high conversion costs. As a result, this technology is practically unused.

DE 10 2015 118 198 A1 discloses an example of monitoring of this type. This document discloses a monitoring unit for an actuating device, where the monitoring unit comprises a control valve, a pneumatic actuator that operates the control valve, and a positioner for controlling the actuating drive.

WO 99/21066 A1 discloses a positioner for an actuating device of a valve, where the positioner comprises a diagnostic unit.

In addition, DE 10 2005 024 686 A1 discloses an actuating device for operating a valve comprising a pneumatic actuator and a diagnostic function.

US 2010/152907 A1 describes a pressure detection unit for a valve system.

US 2015/032270 A1 discloses systems and methods for diagnosing components of a control system for the process industry.

US 2014/0190263 A1 describes a method and an associated device for calibrating a valve.

WO 2003/091614 A1 discloses a system and an associated method for diagnosing a valve.

The option of using additional sensors/actuators, which are connected to one another and to the control system of a process plant via fieldbuses, is also known. This, however, requires a high outlay on additional material that would not be needed for the actual process automation. Additional, local information about a status of the valves can thus be obtained only with high additional expenditure.

SUMMARY OF THE INVENTION

In view of the foregoing, it is therefore an object of the invention to provide a diagnostic system for acquiring safety-relevant data about a valve in an industrial plant, in particular a manufacturing or production plant, which system can be arranged with comparatively low material outlay and cost on valves already fitted in the plant and allows needs-based maintenance of the valves.

This and other objects and advantages are achieved by a valve system comprising a valve, which is operated by a pneumatic actuator and is part of an industrial plant, in particular a manufacturing or production plant, by a diagnostic system, and by a method for detecting a maintenance status of a valve contained in an industrial plant and operated by a pneumatic actuator.

For a valve system of the type described in the introduction, the object is achieved in that the valve system comprises a diagnostic system for acquiring safety-relevant data about the valve, where the diagnostic system comprises at least one pressure detection unit for acquiring data on a pressure variation in the pneumatic actuator of the valve, and/or comprises at least one acoustic detection unit for detecting an acoustic variation in the valve system.

The valve system in accordance with the invention hence comprises a pressure detection unit, such as a compression module, which is configured to determine, directly or indirectly, pressure conditions in the pneumatic actuator of the valve.

The recorded variation (over time) of pressure conditions in the actuator can be used to infer a maintenance status of the valve or of the valve actuator, which will be discussed in greater detail later. In addition, the valve system in accordance with the invention can be produced easily by equipping a conventional valve, which is operated with a pneumatic actuator, with the above-described diagnostic system.

The valve system comprises in addition to, or as an alternative to, the pressure detection unit, an acoustic detection unit for detecting an acoustic variation in the valve system.

The valve system comprises a pilot valve, preferably a solenoid valve, which is configured and provided to control the pneumatic actuator. This pilot valve can be used to control the pneumatic actuators particularly easily.

The diagnostic system comprises an electrical connection to an electrical power supply network supplying the valve, in order to supply power in particular to the pressure detection unit. A major advantage of supplying power in this way, in particular to the pressure detection unit, is that the need to install any additional electrical supply lines or network installations in the industrial plant becomes eliminated, because the diagnostic system uses the existing valve infrastructure. The pneumatic actuator for the valve is typically controlled by a solenoid valve, which in turn is operated by a voltage supply of magnitude 24 Volts.

The technical effort to convert a standard valve into a valve system in accordance with the invention is further simplified by the aforementioned development of the valve system.

The diagnostic system comprises particularly advantageously a measurement unit for identifying changes in the electrical power supply network for the valve, in order to identify a starting point of a closing action or of an opening action of the valve. The advantage here is that the diagnostic system can start the detection of the pressure variation in the actuator and/or detection of the acoustic variation in the valve system specifically immediately after initiation of a closing action or opening action of the valve. It is thereby possible to save resources and avoid excessively large amounts of data. Changes in the electrical power supply network can consist in, for example, a digital output (DO) from a separate control unit for controlling the valve changing a supply voltage for the valve from a logical one to a logical zero, or from a logic zero to a logical one.

The diagnostic system is preferably arranged in a region of the valve. By arranging the pressure detection unit at the valve, i.e., in the immediate vicinity of the valve, it is easily possible to measure a pressure variation in the actuator during closing or opening actions of the valve.

In a particularly advantageous embodiment of the valve system in accordance with the invention, the diagnostic system comprises a buffer unit for buffering energy needed for supplying the pressure detection unit and/or the acoustic detection unit. In the event that the external electrical power supply to the valve fails or changes to a low voltage level deliberately in the event of a logical zero, the buffer unit, such as an electrical energy storage device, guarantees that the pressure detection unit can correctly detect the variation in the pressure conditions in the actuator of the valve, and/or the acoustic detection unit can correctly detect structure-borne sound or airborne sound in the valve system.

In a preferred embodiment of the valve system, the diagnostic system comprises an autonomous energy source, in particular a battery or photovoltaic unit, for supplying the pressure detection unit. The autonomous energy source may exist in addition to a previously described electrical connection of the diagnostic system to an electrical power supply network supplying the valve. With the autonomous energy source, however, it is also possible to dispense entirely with accessing the existing electrical power supply network for the valve. The autonomous power supply can be of major importance specifically with regard to Safety Integrity Level (SIL) approval for the industrial plant or for the valve system, because accessing the existing electrical power supply network for the valve may potentially lower the attained SIL level. In addition, an autonomous energy source can be installed relatively easily as part of the valve system on, or in the immediate vicinity of, the valve.

Advantageously, especially in the case of there being an autonomous power supply, the diagnostic system comprises a unit for acoustically detecting a starting point of a closing action or of an opening action of the valve, in particular by detecting structure-borne sound or airborne sound in the valve. In the case in which there is no connection to the electrical power supply network for the valve, a starting time of an opening or closing action of the valve can no longer be identified by detecting changes in the electrical power supply. An alternative solution for this situation is to use a unit for acoustically detecting the starting point of an opening or closing action of the valve or of the pilot valve. For instance, the starting point can be identified with comparable accuracy by measuring structure-borne or airborne sound.

For this purpose, diagnostic system advantageously comprises an acoustic sensor for detecting structure-borne or airborne sound in the valve. The acoustic sensor can be used not just for sensing the starting point of an opening or closing action but also for detecting a leak in the valve, such as seal tightness during closure and/or with respect to the outside. This can be achieved by detecting and evaluating characteristic sounds that typically occur in the event of leaks. In addition, it is possible to infer the maintenance status of the valve by looking at a frequency spectrum of an entire opening or closing action of the valve over a prolonged period.

In an advantageous embodiment of the valve system, the diagnostic system comprises a memory unit for storing the data on the pressure variation or on an acoustic variation in the pneumatic actuator. The memory unit is preferably configured to store the data without a power supply in order to prevent data loss in the event of a failure of the power supply. The buffer unit or memory unit also allows the data obtained to be stored for a prolonged period in the diagnostic system to defer the further processing and/or transfer of the data.

The diagnostic system advantageously also comprises an output unit for deferred output of the data, in particular via a wired or wireless communication unit. The output unit may be, for example, a serial interface, a Bluetooth® module, a WI-FI® interface or a Global Positioning System (GPS) transmitter. The output unit is configured and provided to transfer either unprocessed raw-data or pre-analyzed data.

Particularly preferably, the valve system comprises a displacement sensor for detecting a position of the pneumatic actuator of the valve. By detecting a distance traveled by the actuator, or in other words detecting its exact position in the valve, the diagnosis of the maintenance status of the valve can be performed even more accurately.

The object mentioned in the introduction is also achieved by a diagnostic system for a valve system for acquiring safety-relevant data about a valve that is operable or operated by a pneumatic actuator and is part of an industrial plant, in particular a manufacturing or production plant. The diagnostic system is characterized in that the diagnostic system comprises a pressure detection unit for acquiring data on a pressure variation in the pneumatic actuator of the valve, and/or comprises an acoustic detection unit for detecting an acoustic variation in the valve system, and preferably comprises a displacement sensor for detecting a position of the pneumatic actuator of the valve, and preferably comprises an acoustic sensor for detecting structure-borne or airborne sound in the valve. Reference is made to the above-explanations with respect to the advantages associated with this system over the systems known hitherto.

The object mentioned in the introduction is also achieved by a method for detecting a maintenance status of a valve contained in an industrial plant and operated by a pneumatic actuator. The method is characterized in that a diagnostic system in accordance with the invention is used to detect a pressure variation of a pneumatic actuator of a valve and/or to detect an acoustic variation in the valve system during a closing action or an opening action of the valve.

Here, the expression "pressure variation of the pneumatic actuator" can mean that the pressure is measured directly in a pressure chamber of the actuator. Equally, however, the expression can also cover the situation in which the pressure is measured in the compressed-air line. In other words, this means that a pressure level is already detected before the air flows into the pressure chamber of the pneumatic actuator.

The diagnostic system is advantageously also used to detect a displacement of the pneumatic actuator of the valve and/or to detect structure-borne or airborne sound in the valve.

In a particularly advantageous embodiment of the method in accordance with the invention, a change in gradient of the pressure variation of the pneumatic actuator, and/or a position of the pneumatic actuator, and/or a frequency characteristic of the structure-borne or airborne sound in the valve is analyzed to evaluate parameters critical to the valve. In particular, from an analysis of the change in gradient of the pressure variation in the actuator, the diagnostic system in accordance with the invention can be used to determine the magnitude of a breakaway thrust or closing force of the actuator and determine the strength at which any jerking occurs during a closing action of the valve. In addition, it is possible to determine a hysteresis of a full stroke action (opening and immediate closing).

Here, the change in gradient results from the fact that pipelines for supplying air to the pneumatic actuator constitute a form of choke. When the valve or the actuator breaks away, a diaphragm arranged in the actuator moves abruptly, thereby increasing a volume contained in the actuator. When this happens, the air flow into the volume cannot follow fast enough via the choke, resulting in a rapid drop in pressure in the actuator. If this change in the gradient of the pressure variation in the actuator is observed over a prolonged period, i.e., over a multiplicity of opening and closing actions of the valve, it is possible to infer a maintenance status of the valve.

By extrapolating the pressure variation curve, it is also possible to predict approximately when the valve is likely to fail, for example, when the breakaway thrust of the valve/actuator is greater than the spring force of the spring assembly of the actuator.

The data acquired by the diagnostic system can be analyzed either locally directly in the diagnostic system or in a downstream analysis unit, for instance, a microprocessor or a Cloud environment.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The following description of the exemplary embodiment, which is explained in greater detail in conjunction with the drawing, will clarify and elucidate the above-described properties, features and advantages of this invention, and the manner in which they are achieved, in which:

FIG. 1 shows a block diagram of a valve system in accordance with the prior art;

FIG. 2 shows a block diagram of a valve system in accordance with the invention having a diagnostic system for acquiring safety-relevant data about the valve;

FIG. 3 shows a block diagram of a first embodiment of a diagnostic system in accordance with the invention for acquiring safety-relevant data about the valve;

FIG. 4 shows a block diagram of a second embodiment of a diagnostic system for acquiring safety-relevant data about the valve;

FIG. 5 shows an exemplary graphical plot of a pressure variation over time in a pneumatic actuator during an opening or closing action of the associated valve.

DETAILED DESCRIPTION OF THE EXEMPLARY EMBODIMENTS

Figure 6:
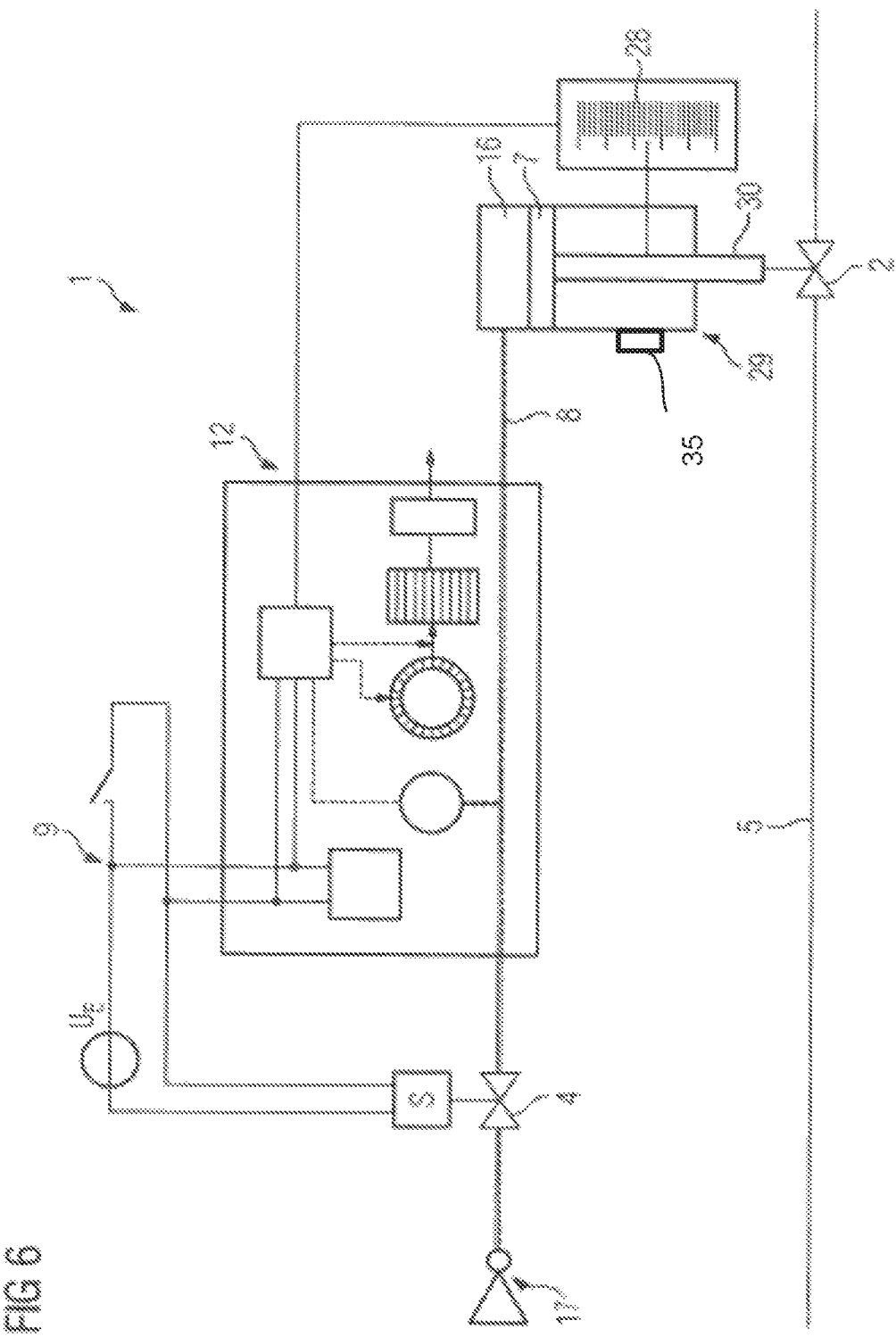
FIG. 6 shows in a block diagram a third embodiment of a diagnostic system in accordance with the invention for acquiring safety-relevant data about the valve.

FIG. 1 shows a valve system 1 in accordance with the prior art. The valve system 1 comprises a process valve 2, a pneumatic actuator 3 and a pilot valve 4.

The process valve 2 controls a medium flowing through a process line 5. The process valve 2 is an On/Off valve, which can be switched between the two states of "valve open" and "valve closed".

The pneumatic actuator 3 is used to switch the process valve 2. In the pneumatic actuator 3, a diaphragm 7 coupled to a valve stem 6 of the process valve 2 is moved in a known manner by compressed air supplied through a compressed-air line 8. In FIG. 1, the pneumatic actuator 3 is shown as representative of the established, known embodiments without restoring springs. The process valve 2 can comprise all known configurations, such as "normally open" or "normally closed", "single-acting" or "double acting".

The pilot valve 4 is supplied with electrical power by an electrical power supply network 9. The electrical power supply network, in a simplified representation, consists of a voltage source 10, which provides a DC voltage of magnitude 24 V, and a momentary contact switch 11 for closing a voltage circuit and actuating the pilot valve 4. Here, the momentary contact switch 11 should be considered as representative of all common actuating/control options available in the context of a process control system of an industrial plant, for example.

The pilot valve 4 controls (or regulates) the flow rate of compressed air, which flows out of a compressed-air source 17 via the compressed-air line 8 into the pneumatic actuator 3.

Diagnosis of a status of the pneumatic actuator 3 and of the process valve 2 is not possible using the previously known valve system 1. This option is made possible only by the embodiments described below of valve systems 1 in accordance with the invention.

FIG. 2 shows a valve system 1, which has the same fundamental design as the valve system 1 previously described (FIG. 1). The valve system 2 shown in FIG. 2, however, is characterized in that it comprises an additional diagnostic system 12. In this exemplary embodiment, the diagnostic system 12 comprises just/only one pressure detection unit 13a. The pressure detection unit 13a, in turn, comprises a pressure sensor 14a and a data logger 15a. In accordance with a first embodiment, the pressure sensor 14a is arranged in the compressed-air line 8, in other words it is part of the compressed-air line 8, and therefore the compressed air flows through the pressure sensor 14a before flowing into the pneumatic actuator 3, where the pressure sensor determines a pressure level in the compressed-air line 8, which it transfers to the data logger 15a. The advantage with this embodiment of the pressure detection unit 13a is that the diagnostic system 12 can easily be integrated subsequently into an existing valve system 1 without having to access the interior of the pneumatic actuator 3.

In accordance with a second embodiment (connection lines to the electrical power supply network 9 are shown dashed), a pressure sensor 14b of a pressure detection unit 13b is arranged in a pressure chamber 16 of the pneumatic actuator 3. The associated data logger 15b is arranged outside the pneumatic actuator 3. The advantage of this embodiment is that the pressure level can be measured directly in the pneumatic actuator 3.

In both embodiments, the data loggers 15a, 15b are each connected to the electrical power supply network 9 in parallel with the pilot valve 4. It is thereby possible to ensure the supply to the data loggers 15a, 15b and to the pressure sensors 14a, 14b connected thereto.

The diagnostic system 12 is configured to detect a pressure variation of the pneumatic actuator 3 during a closure action or an opening action of the process valve 2. Here, the expression "pressure variation of the pneumatic actuator 3" can mean that the pressure is measured directly in a pressure chamber 16 of the actuator 3. Equally, however, the expression can also cover the situation in which the pressure is measured in the compressed-air line 8. In other words, this means that a pressure level is already detected before the air flows into the pressure chamber 16 of the pneumatic actuator 3.

FIG. 3 shows an embodiment of a data logger 15a, 15b. If, for instance, a closing action of the process valve 2 is being monitored, and if a voltage level of the pilot valve 4 operated by the electrical power supply network 9 drops to a value of 0V, the (external) supply to the data logger 15a, 15b, or rather to the entire pressure detection unit 13a 13b, disappears. In order to be able to log and monitor nonetheless the entire closing action of the process valve 2, the data logger 15a, 15b has an energy storage device 18 as a buffer unit for storing electrical energy. This energy storage device 18 may be, for example, a capacitor or a storage battery.

The data logger 14a, 14b also comprises a central processing unit 19, a communication unit 20 for communicating with the pressure sensor 14a, 14b, a circular buffer 21, a data memory 22 and an interface 23 for readout from the data memory 22.

As long as the pilot valve 4 is supplied with electrical power by the electrical power supply network 9 (i.e., the electrical circuit is closed), the data logger 15a, 15b acquires continuously, or at certain intervals, the pressure levels determined by the pressure sensor 14a, 14b. The central processing unit 19, which is preferably in the form of a microcontroller, writes these values to the circular buffer 21. Here, a circular buffer 21 refers to a digital memory that stores data continuously over a certain time period, and overwrites this data again after a certain time has elapsed, in order to release storage space again for new data.

If there is a closure of the pilot valve 4, i.e., an interruption to the electrical power supply 9, this is sensed by the central processing unit 19 (trigger time), which places in the data memory 22 (before the trigger time) a certain number of measured data items (i.e., pressure level data) stored in the circular buffer 21, and a certain number of measured data items determined after the trigger time. The pressure level data held in the data memory 22 can be read out via the interface 23. The central processing unit 19 can perform the sensing using suitable electrical sensors (e.g., Hall effect sensor) or by acoustic detection of a closing action (or opening action) of the process valve or pilot valve. The second context for this is that changes in the status of the process valve 2 or pilot valve can be detected acoustically.

The central processing unit 19 can perform an analysis of the measured data before the readout of the measured data via the interface 23. It is also possible, however, for unprocessed raw-data to be read out and processed further externally, in particular in a Cloud environment.

FIG. 4 discloses an embodiment of the diagnostic system 12, which comprises an autonomous power supply 24. The autonomous power supply may be a powerful storage battery, for example. It is also possible, however, to use a unit that operates by photovoltaic action (solar cell), or the like. The diagnostic system comprises a sensing unit 25 in order to be able to sense a change in status in the power supply to the pilot valve 4. This sensing unit may be a Hall effect sensor, for instance. In order to avoid unnecessary repetition, reference is made to the description of FIG. 3 with regard to the remaining components of the diagnostic system 12 in FIG. 4.

In both of the diagnostic systems 12 described in FIGS. 3 and 4, the pressure sensor 14a, 14b can be arranged in the chamber 16 of the pneumatic actuator 3 or in the compressed-air line 8. In order to increase the accuracy or to facilitate redundant detection of the pressure level, it is also possible to arrange a pressure sensor 14a in the compressed-air line 8, and a pressure sensor 14b in the chamber 16 of the pneumatic actuator 3.

FIG. 5 shows a possible signal waveform 31 of the pressure level in the chamber 16 of the pneumatic actuator 3 of a self-venting actuator 3 in relation to a corresponding control voltage for the pilot valve 4. The trigger time is labeled by to on the horizontal time axis 26 (the time axis 26 is dimensionless). The pressure level in bars and the control voltage in Volts is shown on the vertical axis 27. The measured data that the central processing unit 19 takes from the circular buffer 21 before the trigger time to lies to the left of to in the graph from the time viewpoint. The measured data that is placed in the data memory 22 directly (without being diverted via the circular buffer 21) lies to the right of to in the graph from the time viewpoint.

FIG. 6 shows another embodiment of the diagnostic system 12 described in FIG. 3. The diagnostic system 12 comprises a displacement sensor 28 in addition to the pressure detection unit 13a, 13b. This displacement sensor 28 is configured to detect a position of the pneumatic actuator 3 of the process valve 2. In the case of a linear pneumatic actuator 3, the displacement sensor 28 is mounted between a lantern 29 and a shaft 30 of the actuator 3. The lantern 29 is the reference system for the displacement sensor 28. The shaft 30 moves relative to this reference. The displacement is detected optically or by a giant magneto resistance (GMR) sensor, for instance. It is also possible to use potentiometers or Hall effect sensors in combination with a magnet mounted on the shaft 30.

It is possible by knowing both the pressure in the pneumatic actuator 3 and having information about a distance traveled by the actuator 3 to gain information about a linear movement of the actuator and, hence, indirect information about whether the process valve 2 is closing properly or whether it is closed. Additional information about the status of the process valve 2 can be obtained if the diagnostic system 12 comprises an acoustic sensor 35 for detecting structure-borne or airborne sound in the process valve 2. This acoustic sensor 35 can be arranged, for example, on the lantern 29 of the actuator 3. In addition, microphones in the immediate vicinity of the process valve 2 can serve as an additional data source.

Although the invention has been illustrated and described in detail using the preferred exemplary embodiments, the invention is not limited by the disclosed examples, and a person skilled in the art can derive other variations therefrom without departing from the scope of protection of the invention.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed:

1. A valve system comprising a valve operated by a pneumatic actuator and forming part of an industrial plant, the valve system comprising:
   a diagnostic system for acquiring safety-relevant data about the valve, the diagnostic system comprising:
      at least one of (i) at least one pressure detector which detects data on a pressure variation in the pneumatic actuator of the valve and (ii) at least one acoustic detector which detects an acoustic variation in the valve system;
   a pilot valve which controls the pneumatic actuator;
   an electrical connection to an electrical power supply network supplying the pilot valve to supply electrical power to at least one of (i) the at least one pressure detector and (ii) the at least one acoustic detector;
   wherein the diagnostic system further comprises a measurer which identifies changes in the electrical power supply network for the pilot valve to identify a starting point of a closing or opening action of the valve.

2. The valve system as claimed in claim 1, wherein the diagnostic system is arranged in a region of the valve.

3. The valve system as claimed in claim 1, wherein the diagnostic system comprises an autonomous energy source for supplying at least of (i) the at least one pressure detector and (ii) the at least one acoustic detector.

4. The valve system as claimed in claim 3, wherein the autonomous energy source comprises a battery or photovoltaic receptor.

5. The valve system as claimed in claim 1, wherein the diagnostic system further comprises an acoustic sensor which acoustically detects a starting point of a closing or opening action of the valve.

6. The valve system as claimed in claim 5, wherein said detecting the starting point of the closing or opening action of the valve comprises detecting structure-borne sound or airborne sound in the valve system.

7. The valve system as claimed in claim 1, wherein the diagnostic system further comprises a buffer which buffers electrical energy needed for at least one of (i) the at least one pressure detector and (ii) the at least one acoustic detector.

8. The valve system as claimed in claim 1, wherein the diagnostic system further comprises memory which stores data on a pressure variation or acoustic variation in the pneumatic actuator, the memory being configured to store the data on the pressure variation or acoustic variation in the pneumatic actuator without a power supply.

9. The valve system as claimed in claim 8, wherein the diagnostic system further comprises output which defers output of the data previously stored in the memory.

10. The valve system as claimed in claim 9, wherein the deferred output of the data previously stored in the memory is performed via a wired or wireless communication unit.

11. The valve system as claimed in claim 1, wherein the diagnostic system further comprises a displacement sensor which detects a position of the pneumatic actuator of the valve.

12. The valve system as claimed in claim 1, wherein the diagnostic system further comprises an acoustic sensor which detects structure-borne or airborne sound in the valve.

13. The valve system as claimed in claim 1, wherein the industrial plant comprises a manufacturing or production plant.

14. The valve system as claimed in claim 1, wherein the pilot valve comprises a solenoid valve.

15. A diagnostic system for a valve system for acquiring safety-relevant data about a valve which is operable or operated by a pneumatic actuator and which forms part of an industrial plant, the diagnostic system comprising:
   at least one of (i) a pressure detector which acquires data on a pressure variation in the pneumatic actuator of the valve and (ii) an acoustic detector which detects an acoustic variation in the valve system;
   a displacement sensor which detects a position of the pneumatic actuator of the valve;
   an acoustic sensor which detects structure-borne or airborne sound in the valve;

an electrical connection to an electrical power supply network supplying the pilot valve to supply electrical power to at least one of (i) the pressure detector and (ii) the acoustic detector; and a measurer which identifies changes in the electrical power supply network for the pilot valve to identify a starting point of a closing action or of an opening action of the valve.

16. The diagnostic system of claim 15, wherein the industrial plant comprises a manufacturing or production plant.

17. A method for detecting a maintenance status of a valve installed in an industrial plant and operated by a pneumatic actuator, the method comprising:

utilizing a diagnostic system to detect a pressure variation of at least one of (i) the pneumatic actuator and (ii) an acoustic variation in a valve system during a closing action or an opening action of the valve;

wherein the diagnostic system comprises:

at least one of (i) a pressure detector which acquires data on a pressure variation in the pneumatic actuator of the valve and (ii) an acoustic detector which detects an acoustic variation in the valve system;

a displacement sensor which detects a position of the pneumatic actuator of the valve;

an acoustic sensor which detects structure-borne or airborne sound in the valve;

an electrical connection to an electrical power supply network supplying the pilot valve to supply electrical power to at least one of (i) the pressure detector and (ii) the acoustic detector; and a measurer which identifies changes in the electrical power supply network for the pilot valve to identify a starting point of a closing action or of an opening action of the valve.

18. The method as claimed in claim 17, wherein the diagnostic system detects a displacement of the pneumatic actuator of the valve.

19. The method as claimed in claim 17, wherein the diagnostic system detects structure-borne or airborne sound in the valve system.

20. The method as claimed in claim 18, wherein the diagnostic system detects structure-borne or airborne sound in the valve system.

21. The method as claimed in claim 17, wherein a change in at least one of (i) a gradient of the pressure variation of the pneumatic actuator, (ii) a position of the pneumatic actuator, and (iii) a frequency characteristic of the structure-borne or airborne sound in the valve system is analyzed to evaluate parameters critical to the valve system.

22. The method as claimed in claim 17, wherein at least one of (i) the pressure variation of the pneumatic actuator, (ii) a position of the pneumatic actuator, and (iii) a frequency characteristic of the structure-borne or airborne sound in the valve system is extrapolated in time to predict a likelihood of failure of the valve system.

* * * * *